(12) United States Patent
Lux et al.

(10) Patent No.: US 8,820,168 B2
(45) Date of Patent: Sep. 2, 2014

(54) DEVICE FOR REDUCING PRESSURE PULSES IN PRESSURE SENSORS

(75) Inventors: Alexander Lux, Ostfildern (DE); Martin Mast, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 645 days.

(21) Appl. No.: 13/013,514

(22) Filed: Jan. 25, 2011

(65) Prior Publication Data
US 2011/0198171 A1 Aug. 18, 2011

(30) Foreign Application Priority Data
Feb. 16, 2010 (DE) .......................... 10 2010 001 963

(51) Int. Cl.
*G01L 7/00* (2006.01)
(52) U.S. Cl.
USPC ............................................................ 73/707
(58) Field of Classification Search
USPC .................................................... 73/700–721
See application file for complete search history.

(56) References Cited

U.S. PATENT DOCUMENTS

| | | | |
|---|---|---|---|
| 4,244,212 A * | 1/1981 | Stignani ...................... | 73/112.01 |
| 5,343,754 A * | 9/1994 | Stone .............................. | 73/707 |
| 7,021,149 B2 | 4/2006 | Dannhauer et al. | |
| 8,117,920 B2 * | 2/2012 | Vogler ............................ | 73/706 |
| 2005/0115326 A1* | 6/2005 | Dannhauer et al. ............. | 73/716 |
| 2007/0095145 A1* | 5/2007 | Sato ................................ | 73/716 |

FOREIGN PATENT DOCUMENTS

| | | |
|---|---|---|
| CN | 2786588 | 6/2006 |
| CN | 201004001 | 1/2008 |
| DE | 33 06 711 | 7/1984 |
| DE | 90 17 855.6 | 6/1992 |
| DE | 698 15 801 | 5/2004 |

* cited by examiner

*Primary Examiner* — Christopher Schwartz
(74) *Attorney, Agent, or Firm* — Kenyon & Kenyon LLP

(57) ABSTRACT

A device for damping pressure pulses, in particular in a pressure sensor. The pressure sensor includes a housing. A damping insert, on whose peripheral surface runs a damping channel, is located in the pressure channel of the housing.

10 Claims, 5 Drawing Sheets

DEVICE FOR REDUCING PRESSURE PULSES IN PRESSURE SENSORS

BACKGROUND INFORMATION

German Patent No. DE 33 06 711 relates to a device for damping brief pressure fluctuations in gaseous media. It describes providing a first compensation chamber having a throttling point at its end in the course of the feed lines to a differential pressure measuring device, this end protruding into a second compensation chamber having a substantially larger volume.

German Patent No. DE 698 15 801 T2 relates to a pressure transducer. The pressure transducer includes a connecting piece having a pressure inlet opening. Furthermore, the pressure transducer contains a pressure detection component attached to one end of the pressure inlet opening and an output device which is connected electrically to the pressure detection component. The output device has a circuit support substrate which is attached at a distance from the pressure detection component. A base element is fitted around the pressure detection component and is fastened to the connecting piece. A terminal is attached to the base element, the terminal having an elastically deformable area on a part between the first and the second end.

German Patent No. DE 90 17 855 U1 relates to an overload protection device for pressure sensors. The device for protecting a pressure sensor being submerged in a fluid, in particular a piezoresistive pressure sensor, against brief excess pressure loads, includes a measured pressure inlet of the pressure sensor, an open capillary tube being connected to its free end. The capillary tube is made of a dimensionally stable material such as, for example, metal, Plexiglas, polyamide or the like and is filled with gas or air. The capillary tube is made from an elastic material, the outer wall of which is screened from the ambient pressure. The capillary tube is wound to form a spiral or in the shape of a helix. The spiral or the helix may be subdivided into several, for example, three-part spirals or three-part helices, the angle axes of which are situated at an angle to one another, preferably at a right angle to one another.

In pressures sensors used today, pressure peaks occur on the sensor due to hydraulic vibrations which may even destroy it in an extreme case. One option for preventing this is to install a damping or a throttle for reducing the cross section. The cross section must be adapted to the respective requirements. However, this is in part limited by the technical restraints; furthermore, a reduction of the cross section may possibly have an influence on the interface geometry caused by the connection process.

SUMMARY OF THE INVENTION

An object of the present invention is to integrate a damping insert into a channel, for example a pressure channel of a pressure sensor. This results in a simplification of the manufacture, and an improved damping of occurring pressure pulses or a reduction of pressure peaks is achieved. The use of a damping insert having at least one damping channel is capable of reducing the technical problem of limited manufacturability and the influence on the interface geometry or the connection process.

The geometric design of the damping insert considerably increases the propagation of the pressure pulse. For example, the damping channel on the damping insert may extend like a thread turn on its peripheral surface, thus making it possible to increase the length of the damping channel considerably—in this case extending in the circumferential direction. The damping insert having its at least one damping channel provided on the peripheral surface is installed in the housing of the pressure sensor in such a way that, for example, one or several damping channels extending in the shape of a spiral on the peripheral surface of the damping insert are covered, i.e., closed by the housing wall. The increased wall friction, to which a pressure pulse passing through the at least one damping channel is exposed, and occurring interferences make it no longer possible for pressure peaks, which ultimately contact the sensor element, to damage it, since the pressure energy is considerably reduced during the passage of the at least one damping channel along the peripheral surface of the damping insert. The geometric shape of the at least one damping channel may be designed in an optimal way for the manufacture of the damping insert.

The damping insert described according to the present invention may be installed in the pressure connection of a pressure sensor, in particular in its pressure channel. In addition, the option exists to install the damping insert in a channel in the housing of the pressure sensor which is parallel to the pressure channel. The pressure sensor may have a thread or be fastened to a flange connection. The attachment of the damping insert described according to the present invention in the pressure channel of the pressure sensor may be accomplished mechanically, for example, by peening, or thermally, for example using an integral joining process such as, for example, welding.

The damping capacity of the damping insert described according to the present invention, for example, in the pressure channel of the housing of the damping insert integrated into the pressure sensor, is determined in particular by the length of the at least one damping channel on the peripheral surface of the damping insert. The longer the length of the damping channel extending in the circumferential direction is made, the greater is the possible damping of the pressure pulse passing through this at least one damping channel. Advantageously, the damping capacity of the damping insert described according to the present invention is advantageously influenced by several openings distributed on the periphery, resulting in a relatively slight risk of clogging caused by particles contained in, the gaseous medium. The damping insert described according to the present invention also makes it possible to cause the propagations of the pressure pulses to cross over with a mutual elimination of the pressure pulses within the damping channel, and due to the length of the at least one damping channel in the circumferential direction on the peripheral surface of the damping insert, it is possible to achieve a substantial delay of the pressure pulse.

DETAILED DESCRIPTION

Figure 1:
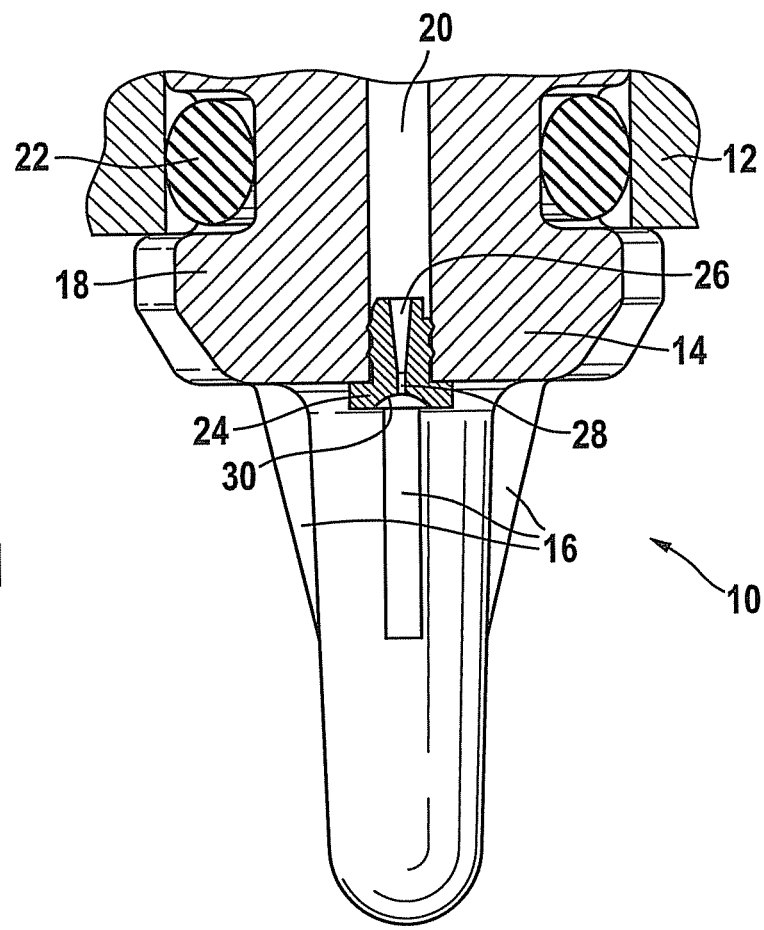
FIG. 1 shows a sensor, in particular a pressure sensor having a flange connection.

The representation according to FIG. 1 shows a sensor, in particular a pressure sensor 10, the housing 14 of which is fastened to a flange 12. The sensor, in particular designed as a pressure sensor 10, extends vertically downward on one flat side of flange 12. Pressure sensor 10 includes housing 14, through which a pressure channel 20 extends. FIG. 1 also shows that housing 12 of pressure sensor 10 is sealed relative to flange 12 with the aid of a sealing element 22. Housing 14 includes a thread which is not shown in FIG. 1, via which housing 14 of pressure sensor 10 is fastened to flange 12. During attachment of housing 14 of pressure sensor 10, the upper annular surface of a shoulder 18, which is formed on housing 14, contacts a lower flat side of flange 12 and compresses sealing element 22 which is inserted into a corresponding recess of housing 14 of pressure sensor 10. As FIG. 1 also shows, pressure channel 20, in which throttle insert 24 is formed, extends through housing 14 of pressure sensor 10. Throttle insert 24 includes a throttling point 28 and a cross-sectional widening 26 provided in the direction of pressure channel 20. A concavity 30 is inserted into throttle insert 24 on the inflow side of throttle insert 24 upstream from throttling point 28; throttling point 28 directly adjoins the concavity.

Housing 14 of pressure sensor 10 further includes a ribbing 16, ribbing 16 having several individual ribs in this case oriented by 90° in relation to one another in the circumferential direction. Ribbing 16 stiffens the appendage of pressure sensor 10 extending essentially vertically downward, through which pressure channel 20—not shown in FIG. 1—extends to the rounded off point.

Figure 2:
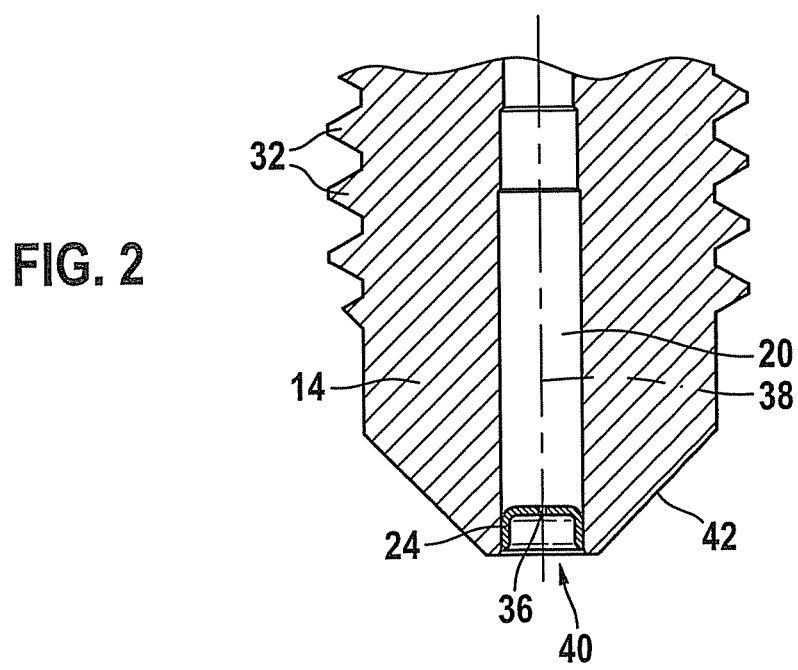
FIG. 2 shows the schematic representation of a sensor, in particular a pressure sensor having a threaded connection.

FIG. 2 shows a sensor, in particular a pressure sensor having a threaded connection.

The cross-sectional representation according to FIG. 2 shows that housing 14 of pressure sensor 10 has several thread turns of a thread 32 on its outside. A cone 42 is located on the underside of housing 14 for sealing a conical seat, which is not shown in FIG. 2, when housing 14 is screwed into such a seat. Housing 14 includes pressure channel 20 and is formed symmetrically to an axis 38. An opening 40 of pressure channel 20 is located in the area of cone 42. As shown in FIG. 2, throttle insert 24 is installed in the area of opening 40 of pressure channel 20. Throttle insert 24 has an essentially pot-shaped appearance, an opening 36 being formed in the bottom of throttle insert 24 designed in the shape of a pot.

The difference between the variants according to FIGS. 1 and 2 is that in the embodiment variant according to FIG. 2, pressure channel 20 extends centrally in housing 14 of pressure sensor 10, while pressure channel 20 in the embodiment variant according to FIG. 1 is formed eccentrically in housing 14.

Figure 3:
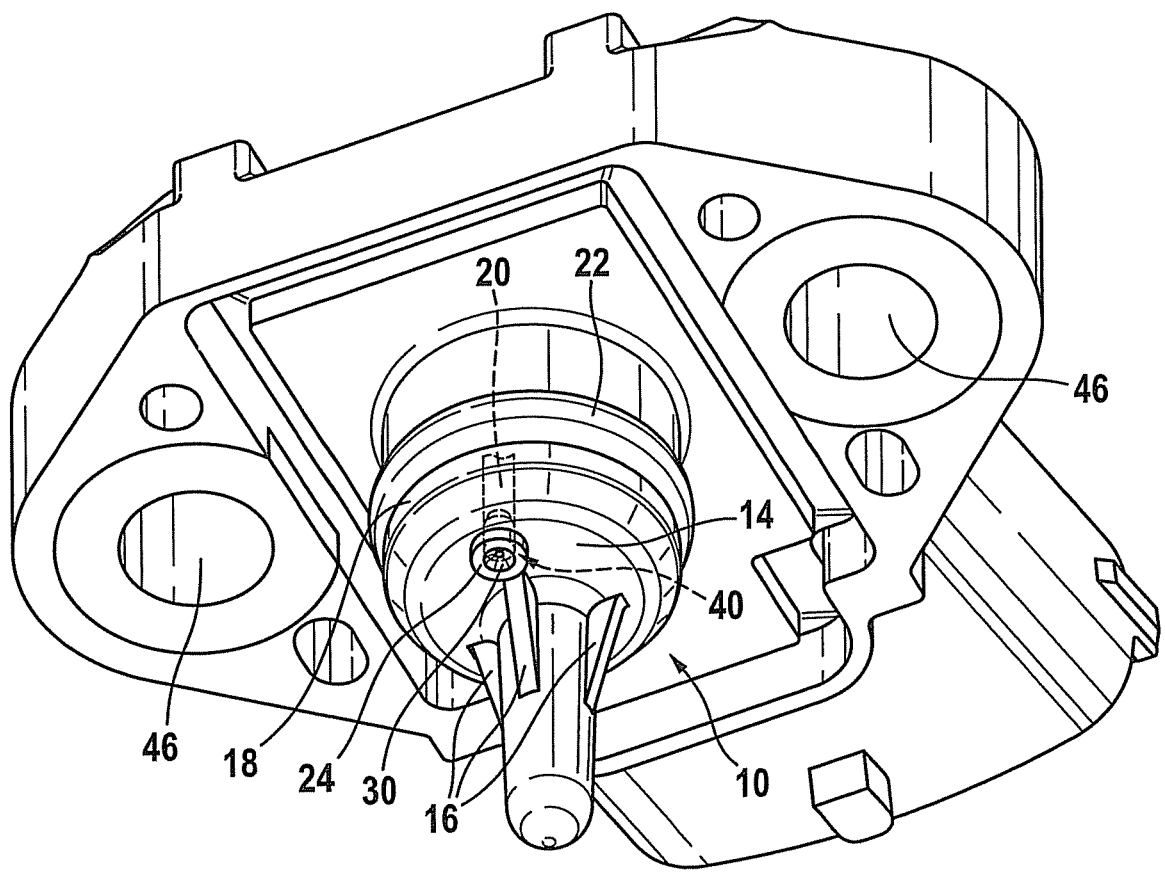
FIG. 3 shows a perspective view of the pressure sensor having a flange connection.

FIG. 3 shows a perspective view of the pressure sensor having a flange connection.

As shown in FIG. 3, pressure sensor 10 essentially projects vertically downward from the lower flat side of flange 12. Fastening openings 46 are located in flange 12; furthermore a socket opening for the electrical contacting of pressure sensor 10 on the underside of flange 12 extends above flange 12. Pressure channel 20 depicted by dashed lines in the representation according to FIG. 3 extends in the appendage, the peripheral surface of which is stiffened by ribbing 16, the pressure channel leading to an opening 40 in the point of the appendage of pressure sensor 10. Ribbing 16 ends below shoulder 18 which is used to screw housing 14 of pressure sensor 10 into flange 12. Sealing element 22 is accommodated above shoulder 18 in a corresponding recess on peripheral surface 14.

Figure 4:
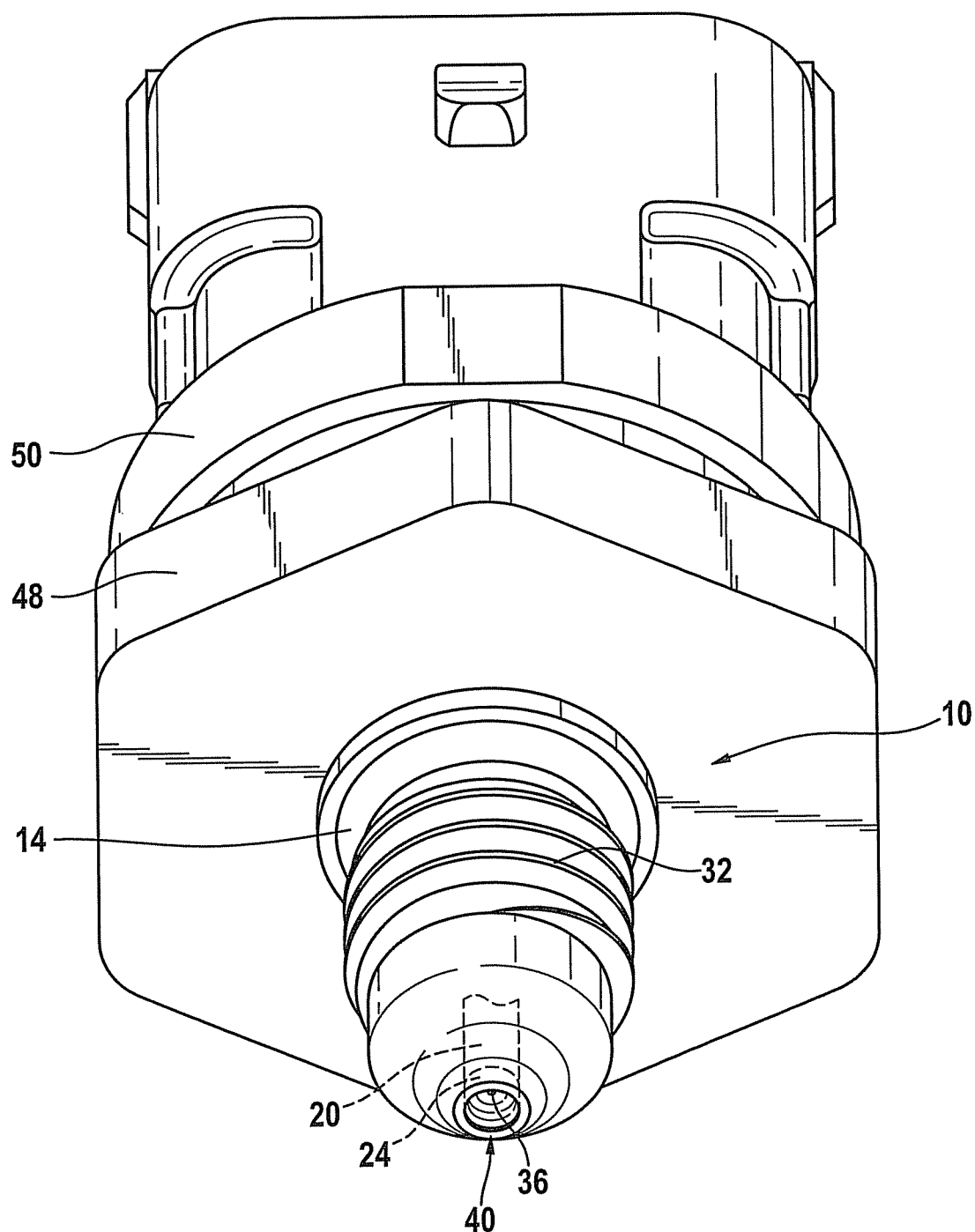
FIG. 4 shows a perspective view of the pressure sensor having a threaded connection.

The representation according to FIG. 4 shows a perspective view of the pressure sensor having a threaded connection according to FIG. 2.

Housing 14 of pressure sensor 10, which in this embodiment variant is provided with a thread 32 having several thread turns on its peripheral surface, extends below a tool base 48. Below thread runout of thread 32, it is possible to form a rounded seat on housing 14 as shown in FIG. 4, or even a cone 42 as shown in the representation according to FIG. 2, the cone being inserted into a conical seat designed to have a complementary geometry. As FIG. 4 shows, pressure channel 20, which ends at the point of housing 14 in opening 40, extends centrally through housing 14. A shoulder 50 extends above tool base 48 for generating a screw-in torque, a plug connection again being provided above shoulder 50 for the electrical contacting of pressure sensor 10.

Figure 5:
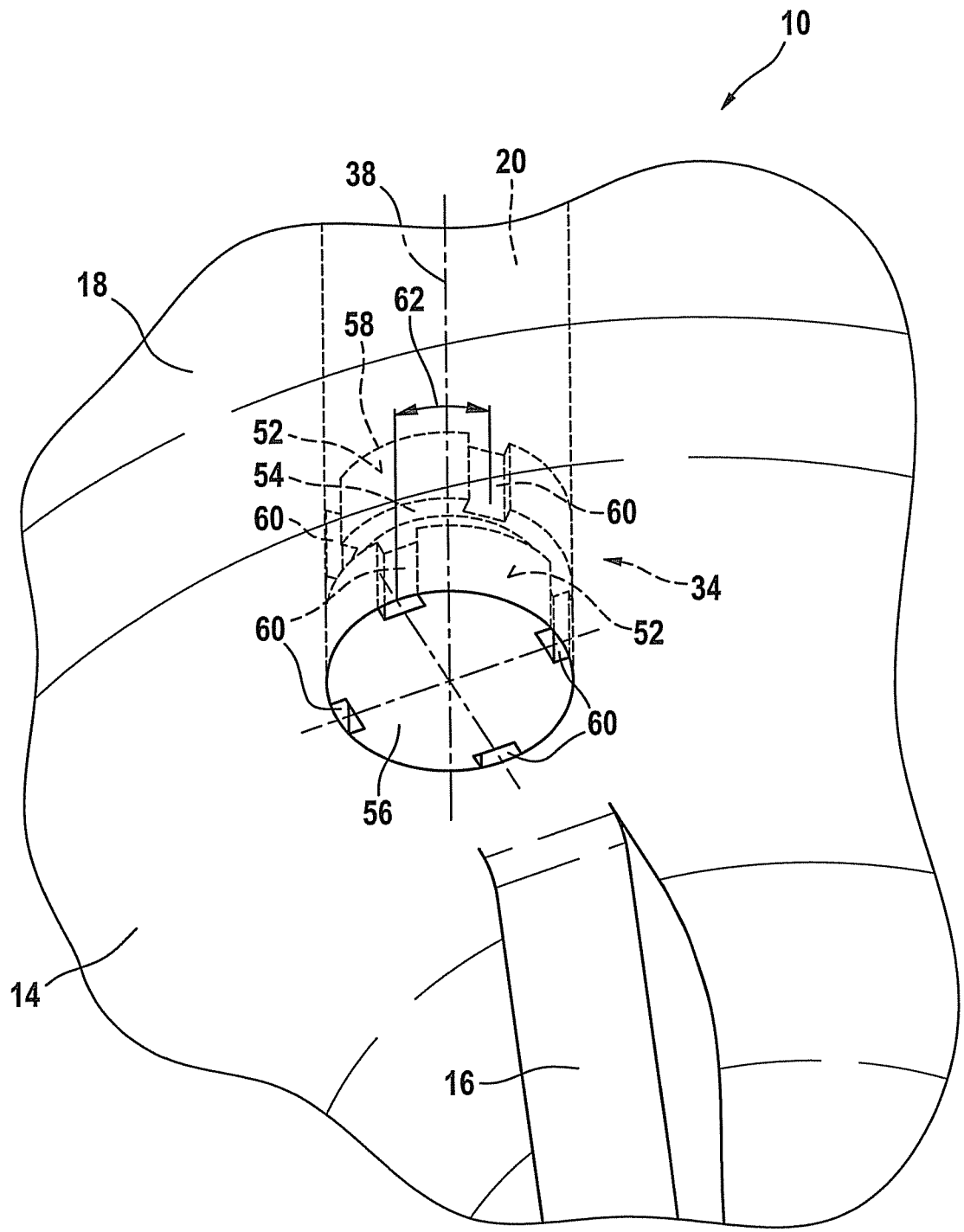
FIG. 5 shows the damping insert in the condition when installed in the pressure channel.

The representation according to FIG. 5 shows the damping insert described according to the present invention in the condition when installed in the pressure channel, pressure channel 20 extending eccentrically in housing 14.

The representation according to FIG. 5 shows an enlarged detail of the perspective representation according to FIG. 3.

A pressure pulse, which flows through opening 40 at the point of the appendage of pressure sensor 10 into pressure channel 20, passes through pressure channel 20 before it contacts a first flat side 56 of a damping insert 34 inserted into pressure channel 20 according to the representation in FIG. 5. Preferably, damping insert 34 is mechanically fastened in pressure channel 20, for example, by hot peening, or is fastened within pressure channel 20 using an integral joining method such as, for example, welding. As shown in the representation according to FIG. 5, damping insert 34 includes a peripheral surface 52. Peripheral openings 60 are introduced in peripheral surface 52. Peripheral openings 60 are provided in a 90° orientation in the embodiment variant according to FIG. 5. Instead of four peripheral openings 60 as represented in FIG. 5, which are situated offset 90° from one another, it would also be possible to provide only two or three peripheral openings 60. Damping insert 34 has a circumferential damping channel 54 roughly in its center as seen with regard to its axial length. Damping channel 54 is delimited by a section of damping insert 34, in the peripheral surface 52 of which a number of peripheral openings 60 are also formed. These peripheral openings 60 are formed in an offset 62 in relation to the above-mentioned peripheral openings 60. In the embodiment variant according to FIG. 5, damping insert 34 has a single damping channel 54 produced as a circumferential groove, via which a propagation of a pressure impulse is increased. On the outflow side, i.e., in the area of a second flat side 58 of damping insert 34 essentially designed in the form of a cylinder, the gaseous medium flows into pressure channel 20 and, with a reduced impulse, toward the sensor element situated at the end of pressure channel 20.

Damping channel 54 which is inserted into the center of peripheral surface 52 of damping insert 34 in the representation according to FIG. 5 is on the one hand delimited by peripheral surface 52 of damping insert 34 and on the other hand by the wall of pressure channel 20. Damping insert 34 causes increased wall friction of the gaseous medium while the medium flows through the at least one damping channel 54 which is formed in peripheral surface 52 of damping insert 34. The more it is possible to increase the propagation of the pressure pulse by damping channel 54, the greater is the possible reduction of the impulse of the pressure pulse, so that the pressure peaks that ultimately contact the sensor element situated at the end of pressure channel 20 are drastically minimized and no longer damage it. Instead of damping channel 54 designed as a circumferential groove shown in FIG. 5, a damping channel configured similar to a thread turn is also conceivable, in contrast to the representation according to FIG. 5, it being possible for damping channel 54 to have several windings in the form of, for example, a spiral winding 68, see representation according to FIG. 7. The more often the gaseous medium, i.e., the pressure pulses of the same, pass through damping channel 54 or windings 66 of damping channel 54, the greater is the wall friction, making it possible to achieve a higher reduction of impulses by using the approach described according to the present invention. Advantageously, the approach described according to the present invention may be used to cause pressure pulses to mutually eliminate one another if they pass through crossing pressure propagations, i.e., crossing or intersecting damping channels 54 or their individual windings 66. The number of peripheral openings 60 on peripheral surface 52 of damping insert 34 described according to the present invention advantageously avoid a risk of clogging caused by particles contained in the gaseous medium and accumulating on peripheral openings 60.

Using the approach according to the present invention of inserting a damping insert 34 into pressure channel 20 as a function of the design of the propagation of the pressure pulse through the at least one damping channel 54 or through its windings 66, and the buffer volume present downstream from damping insert 34, i.e., on second flat side 58 of the damping insert, makes it advantageously possible to optimize the ensuing damping effect.

For the sake of completeness, it should be mentioned that pressure channel 20 represented by dashed lines in FIG. 5—as already mentioned in connection with FIG. 3—is subjected to flow through opening 40 at the point of the appendage of pressure sensor 10 through pressure channel 20. Depending on the position of damping insert 34 within the axial length of pressure channel 20, the buffer volume present downstream from second flat side 58 of damping insert 34 may be utilized for further damping of the pressure pulse.

Figure 6:
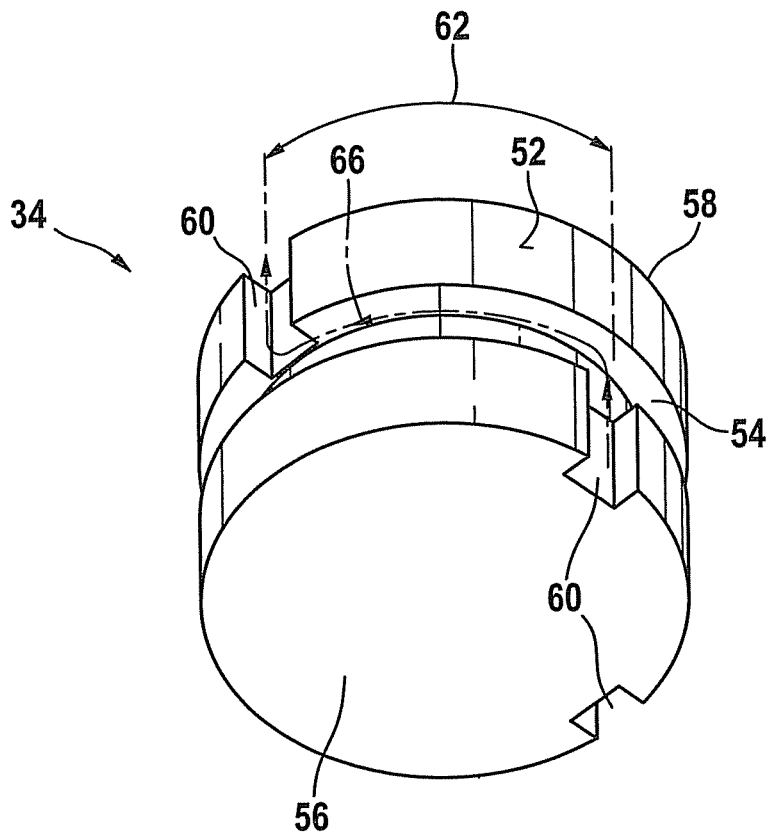
FIG. 6 shows a first embodiment variant of the damping insert.

A first embodiment variant of the damping insert is shown individually in the representation according to FIG. 6.

As already explained above in connection with FIG. 5, damping insert 34 is delimited by a first flat side 56 and a second flat side 58. In the embodiment variant shown in FIG. 6, which corresponds to the embodiment variant in the condition when installed according to FIG. 5, an individual damping channel 54 is inserted into peripheral surface 52 of damping element 34 essentially designed in the form of a cylinder. This damping channel increases propagation 66 of a pressure pulse occurring on first flat side 56 via peripheral openings 60 in peripheral surface 52. The increase of propagation 66 implemented in the circumferential direction across damping channel 54 causes a significant increase in the wall friction, so that pressure peaks are implemented during the passage of damping channel 54 incorporated in peripheral surface 52 of damping insert 34 as a circumferential groove. On the outflow side, i.e., the part of damping insert 34 which extends to second flat side 58, peripheral openings 60 in peripheral surface 52 are situated offset by approximately 90° in relation to peripheral openings 60 which open on first flat side 56 of damping insert 34.

Figure 7:
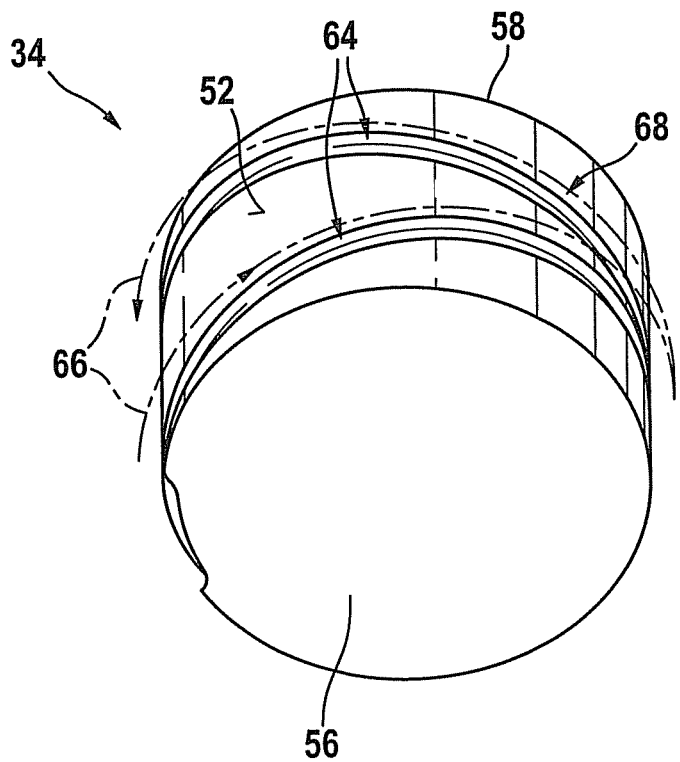
FIG. 7 shows another embodiment variant of the damping insert.

Offset 62 of peripheral openings 60 as shown in FIG. 6 makes it possible for propagations 66 to cross and accordingly favor a mutual elimination of pressure pulses in circumferential channel 64. The damping insert described according to the present invention is shown in the representation according to FIG. 7, a damping channel 54 extending as a spiral winding 68 on its peripheral surface 52. In contrast to the embodiment variant of the damping insert according to FIG. 6, the individual windings of spiral winding 68 in the exemplary embodiment according to FIG. 7 are oriented on peripheral surface 52 of damping insert 34 in such a way that one of windings 34 extends to second flat side 58 and one winding 64 of spiral winding 68 extends in the direction of first flat side 56 of damping insert 34 and ends there. The embodiment variant according to FIG. 7 makes it possible to use a spiral winding 68 to achieve a substantial increase of propagation 66 of a pressure pulse through a damping channel or a damping channel system 34 which is provided in peripheral surface 52 of damping insert 34. In contrast to the embodiment variant according to FIG. 6, the embodiment variant of damping insert 34 described according to the present invention shown in FIG. 7 includes no peripheral openings 60, but instead individual windings 64 of spiral winding 68 end with soft transitions in first flat side 56 and second flat side 58 of damping insert 34 essentially designed in the form of a cylinder.

With regard to the installation position of damping insert 34 described according to the present invention and essentially designed in the form of a cylinder, its first flat side 56 represents an inflow side for the gaseous medium and its second flat side 58 represents an outflow side from which the gaseous medium flows into pressure channel 20 used as a buffer after the pressure impulse is reduced by passing through the at least one damping channel 54.

What is claimed is:

1. A device for damping pressure pulses, comprising:
a housing having a pressure channel;
a damping insert having a peripheral surface, the damping insert being situated in the pressure channel of the housing; and
at least one damping channel extending on the peripheral surface of the damping insert;
wherein the at least one damping channel has a circumferential groove between an inflow side and an outflow side of the damping insert.

2. The device according to claim 1, wherein the damping channel in the peripheral surface of the damping insert has at least one winding.

3. The device according to claim 2, wherein peripheral openings are situated in the peripheral surface of the damping insert on one inflow side and on one outflow side.

4. The device according to claim 3, wherein the peripheral openings are situated on the inflow side and the outflow side distributed in an angular offset to one another.

5. The device according to claim 1, wherein the device is situated in a pressure sensor.

6. The device according to claim 1, wherein the at least one damping channel has a rectangular or square flow cross section.

7. The device according to claim 1, wherein the damping channel of the damping insert is covered by a wall of the pressure channel.

8. The device according to claim 1, wherein the damping channel has a rounded flow cross section.

9. The device according to claim 1, wherein the damping insert is mechanically fastened in the pressure channel.

10. The device according to claim 1, wherein the damping insert is joined in the pressure channel by hot peening or integrally, or welded.

\* \* \* \* \*